US 8,214,509 B2

(12) United States Patent
Dabagh et al.

(10) Patent No.: US 8,214,509 B2
(45) Date of Patent: Jul. 3, 2012

(54) RECEIVE COALESCING AND DIRECT DATA PLACEMENT

(75) Inventors: Alireza Dabagh, Kirkland, WA (US); Murari Sridharan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 11/823,295

(22) Filed: Jun. 27, 2007

(65) Prior Publication Data

US 2008/0082685 A1     Apr. 3, 2008

Related U.S. Application Data

(60) Provisional application No. 60/848,727, filed on Oct. 2, 2006.

(51) Int. Cl.
*G06F 15/173* (2006.01)
*G06F 15/16* (2006.01)

(52) U.S. Cl. ........................................ 709/228; 709/232
(58) Field of Classification Search .......... 370/351–430; 709/228–244
See application file for complete search history.

(56) References Cited

U.S. PATENT DOCUMENTS

| | | | |
|---|---|---|---|
| 6,141,705 A | 10/2000 | Anand et al. | |
| 6,956,853 B1 * | 10/2005 | Connery et al. | 370/392 |
| 7,007,103 B2 | 2/2006 | Pinkerton et al. | |
| 7,971,250 B2 * | 6/2011 | Walter | 726/23 |
| 2004/0073703 A1 * | 4/2004 | Boucher et al. | 709/245 |
| 2004/0218532 A1 * | 11/2004 | Khirman | 370/235 |
| 2006/0161980 A1 * | 7/2006 | Huitema et al. | 726/22 |

OTHER PUBLICATIONS

Harlan T. Beverly, "Killer Network Interface Card", *Bigfoot Networks, Inc.*, 1996, pp. 1-7.

* cited by examiner

*Primary Examiner* — Ian N Moore
*Assistant Examiner* — Afshawn Towfighi (57) ABSTRACT

A networked computer with a network interface device to which the network stack can offload a subset of the functions needed to process received data packets. The network interface device can receive a map between connections and application buffers. Upon receipt of a data packet through a connection, the network interface device may use the map to identify an application buffer and transfer the data packet to that application buffer. The network interface device may be programmed to recognize qualifications on data packets appropriate for transfer to an application buffer, such as by receiving the sequence number of the next expected packet. Because the network interface device can recognize packets for transfer to an application buffer by simple comparison of a packet header to the map, additional hardware required in the network interface device to perform the offloaded functions is lightweight.

18 Claims, 6 Drawing Sheets

RECEIVE COALESCING AND DIRECT DATA PLACEMENT

RELATED APPLICATION

This application claims the benefit under 35 U.S.C. §119 (e) of U.S. Provisional Application Ser. No. 60/848,727, entitled "LIGHTWEIGHT NETWORK STACK OFFLOAD," filed on Oct. 2, 2006, which is herein incorporated by reference in its entirety.

BACKGROUND

Most computers, even portable and hand-held computers, are connected to one or more networks. Network connectivity allows a computer to send and receive a wide range of data, which in turn enables the computer to execute applications that perform many useful functions based on that data.

A combination of communication hardware and software components is used to configure a computer for network communication. A network interface in the computer typically includes a physical network interface device and a software driver that provides a programming interface to the physical network interface device. Communication software within the operating system for the computer interacts with the network interface through the programming interface.

When an application needs to transmit data over the network, the application provides the data to the communication software. The communication software typically forms the data into packets, which are then passed through the programming interface to the physical network interface device for transmission over the network.

When data is sent over the network to an application on the computer, the physical interface device receives packets of data over the network, and places the data in memory. The network interface then notifies the communication software and the communication software uses information transmitted with the packet to determine the application that is intended as the destination for the data in the packet. The communication software then transfers the received data to a buffer used by the destination application and notifies that application that data is available. The destination application can then use the data.

Network packets are communicated in accordance with one or more network protocols to allow communication hardware and software to appropriately process each packet. Frequently, network communications are formatted based on multi-layered protocols. Each protocol layer specifies information needed for routing packets through various portions of the network. The information associated with each protocol layer is typically processed separately. For this reason, communication software within a computer is often described as a "stack." The stack contains multiple components, each for processing packets in accordance with one of the protocol layers.

Processing within the stack may format data for transmission over the network. For received packets, processing may involve identifying the intended destination of data transmitted over the network. In addition, processing within the stack may involve maintaining state information needed to communicate in accordance with a network protocol.

In some computers, processing that is traditionally performed in the stack is "offloaded" to the physical network interface device. Applications transmitting messages may bypass the network stack and provide data to be transmitted over the network directly to the network interface device through the network interface driver. For received packets, the network interface device may bypass the network stack and provide received data to an application that is the intended destination for the data.

SUMMARY OF INVENTION

To reduce processor loading in a computer with a network interface, the network interface can perform a subset of network processing functions conventionally performed in the stack. The network stack may offload processing functions related to providing received data to the intended destinations. The network interface may transfer data to application buffers associated with destination applications, which frees the network stack from processing relating to identifying and transferring data to the application buffers. Processing performed by the network interface device, though reducing the processing load of the network stack, is "lightweight" because it imposes relatively few requirements on the design of the network interface device.

In some embodiments, the network interface does not maintain state information on network connections. Rather, it maintains a map between connections and application buffers so that the network interface may identify the destination for received data based on relatively simple matching operations. The information in the map is either stateless or updated by the network stack. Nonetheless, the network interface, for many received packets, may be able to directly place packets of data into application buffers.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Offloading network processing from a stack provides the advantage of reducing the demands on a processor for a computer. However, the inventors have appreciated that offloading all communication functions can be undesirable in some instances because implementation of communication functions becomes dependent on design choices made by the designer of the network interface to which that processing is offloaded. Variations in design among network interfaces provided by different suppliers may introduce unintended variability in the operation of communication functions by the computer. In addition, the large number of network interface suppliers may increase complexity for computer users wishing to upgrade or maintain communication functions of their computers.

By appropriately selecting the functions to be offloaded to a network interface, a "lightweight" network interface can provide many of the advantages of fully offloading communication functions. However, a lightweight network interface decreases the requirements on the network interface device relative to a full offload, which avoids many of the disadvantages of a full offload. In the network interface described herein, one or more functions associated with the transfer of data from received packets to application buffers can be offloaded.

Figure 1:
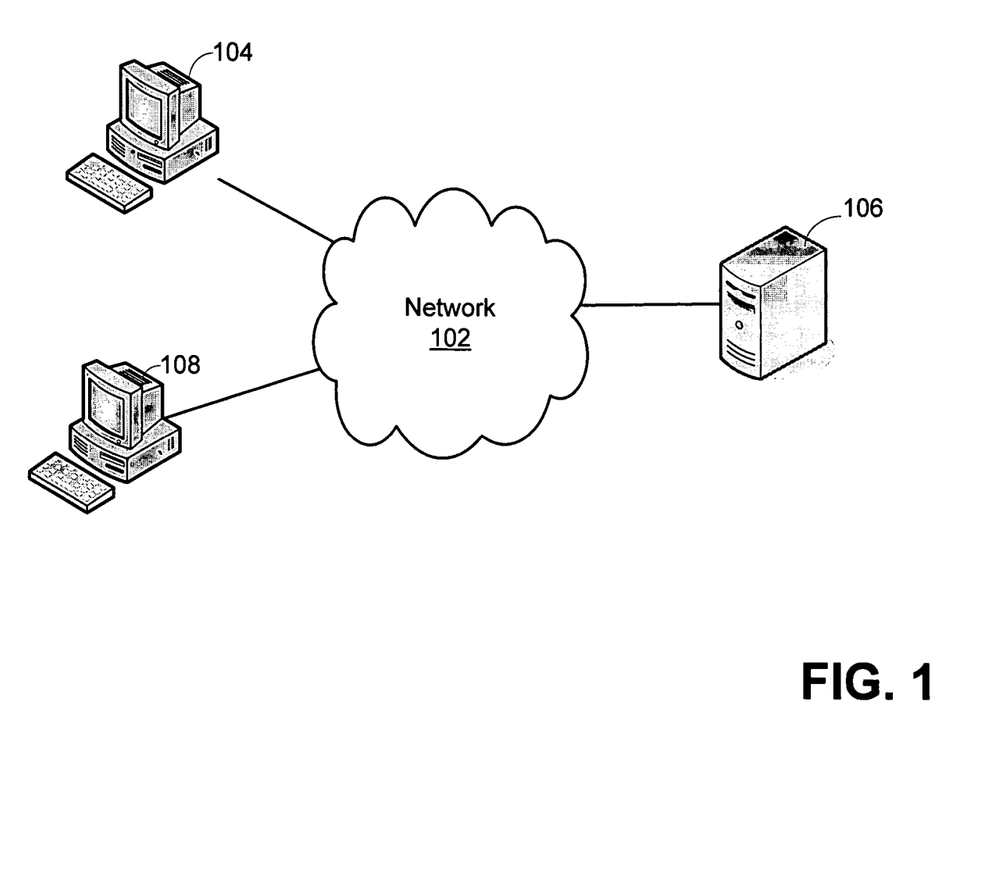
FIG. 1 is a sketch of a network environment in which an embodiment of the invention may be used.

FIG. 1 illustrates an environment in which the invention may be employed. FIG. 1 shows a network 102 with multiple computers, 104, 106, 108. Computers 104, 106 and 108 may send and receive data over network 102. Any or all of the computers may employ a network interface according to an embodiment of the invention. Computer 104 is used as an example of a computer that has a network interface according to an embodiment of the invention.

Figure 2:
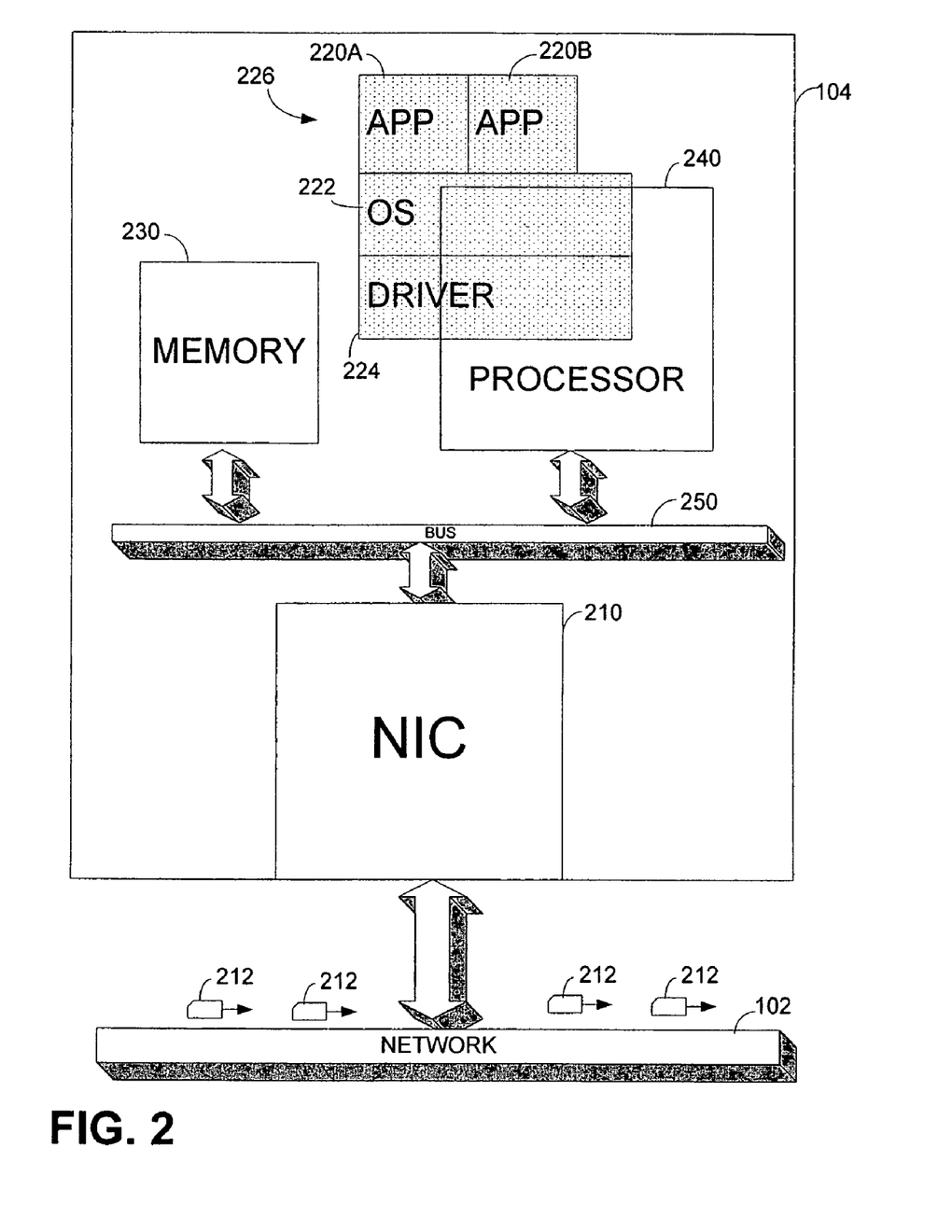
FIG. 2 is a structural block diagram of a computer according to an embodiment of the invention.

FIG. 2 shows a structural block diagram of computer 104. FIG. 2 is a simplified structural block diagram. Computer system 104 may contain other components not expressly shown in FIG. 2, such as one or more user interfaces, and removable storage media. Accordingly, the specific components within computer 104 is not a limitation on the invention and computer system 104 may contain any suitable components.

As shown in FIG. 2, computer 104 has a processor 240 that communicates over internal bus 250 with other components within computer 104. Computer system 104 also contains a network interface, here represented by physical network interface card 210 connected to internal bus 250. Additionally, memory 230 is connected to bus 250. Though a single structure is shown for memory 230, memory 230 may be implemented as one or more boards, modules, integrated circuits or other components.

In operation, processor 240 may execute software 226, which causes computer 104 to perform functions. In the illustration of FIG. 2, software 226 is shown to contain multiple applications, of which applications 220A and 220B are illustrated. For example, computer 104 may be a desktop computer and applications 220A and 220B may provide word processing and Internet access. Alternatively, computer 104 may be a handheld device and applications 220A and 220B may provide e-mail access and calendar functions. Though, different or additional applications may be included to perform any suitable function. Accordingly, the specific functions performed by software 226 is not a limitation of the invention.

Software 226 includes operating system 222. Operating system 222 performs many different types of functions that are needed for execution of applications such as applications 220A and 220B. In the description that follows, communication functions of operating system 222 are described. However, operating system 222 may perform other functions. Accordingly, the specific functions performed by operating system 222 is not a limitation on the invention.

Software 226 also contains one or more drivers 224. Drivers 224 are software that control components outside of operating system 222. Frequently, drivers control hardware components such as physical network interface card 210, outside of operating system 222. In FIG. 2, physical network interface card 210 is controlled by driver 224. Though not expressly shown, computer 104 may contain additional drivers to control other components within computer 104.

In operation, an application may use communication software within operating system 222 to exchange data with an application in another computer, such as computer 106 or 108 (FIG. 1). To transmit data, the application may place a call to communication software within operating system 222 that will form the data into packets in a format consistent with a protocol used by network 102. The operating system 222 will then place calls to driver 224 to cause physical network interface card 210 to transmit those packets in the required format over network 102.

When packets 212 transmitted over network 102 are destined for an application 220A or 220B within computer 104, physical network interface card 210 receives the packets over network 102 and stores data from the packets in memory 230. Physical network interface card 210 then provides an indication that data is in memory 230. This indication may be provided through driver 224 to the communication software within operating system 222. The communication software in operating system 222 in turn provides an indication to the application that is the destination for the data in the received packet. The application may then read data from memory 230.

Information in the header of each received packet allows components within computer 104 to determine the application that is the destination for the data. A network protocol specifies the type of information that is included in the header of each packet. A widely used protocol for transmission of data from one application to another application is called Transmission Control Protocol (TCP). TCP is used herein as an example of a connection-oriented protocol. Prior to communication using TCP, a connection is established between the applications that will exchange data. As part of establishing a connection, the communication software within operating system 222 obtains source and destination information for the applications that are to communicate. This information allows the software to appropriately format a packet destined for an application in another computer or to appropriately route a received packet to a destination application within computer 104.

Though transmission and receipt of data is conceptually simple, communication software may perform extensive computations particularly in a computer maintaining multiple network connections. To reduce the load on processor 240 from executing communication software, computer 104 may have a network interface designed so that operating system 222 may offload a subset of the functions performed as part of the receipt of data over network 102.

In some embodiments, physical network interface card 210 and driver 224 may differ from comparable components those in a conventional network interface in that they can receive information specifying a mapping between connections and locations in memory 230 where data received over those connections is stored. As packets are received, physical network interface card 210 may transfer data associated with those packets into locations in the memory 230 that are associated with the destination applications. When driver 224 notifies communication software within operating system 222 of a received packet, the operating system software does not need to process the received packet to identify the intended destination or to transfer the data to memory locations read by the destination applications. In this way, the load on processor 240 is shifted to physical network interface device 210.

Figure 3:
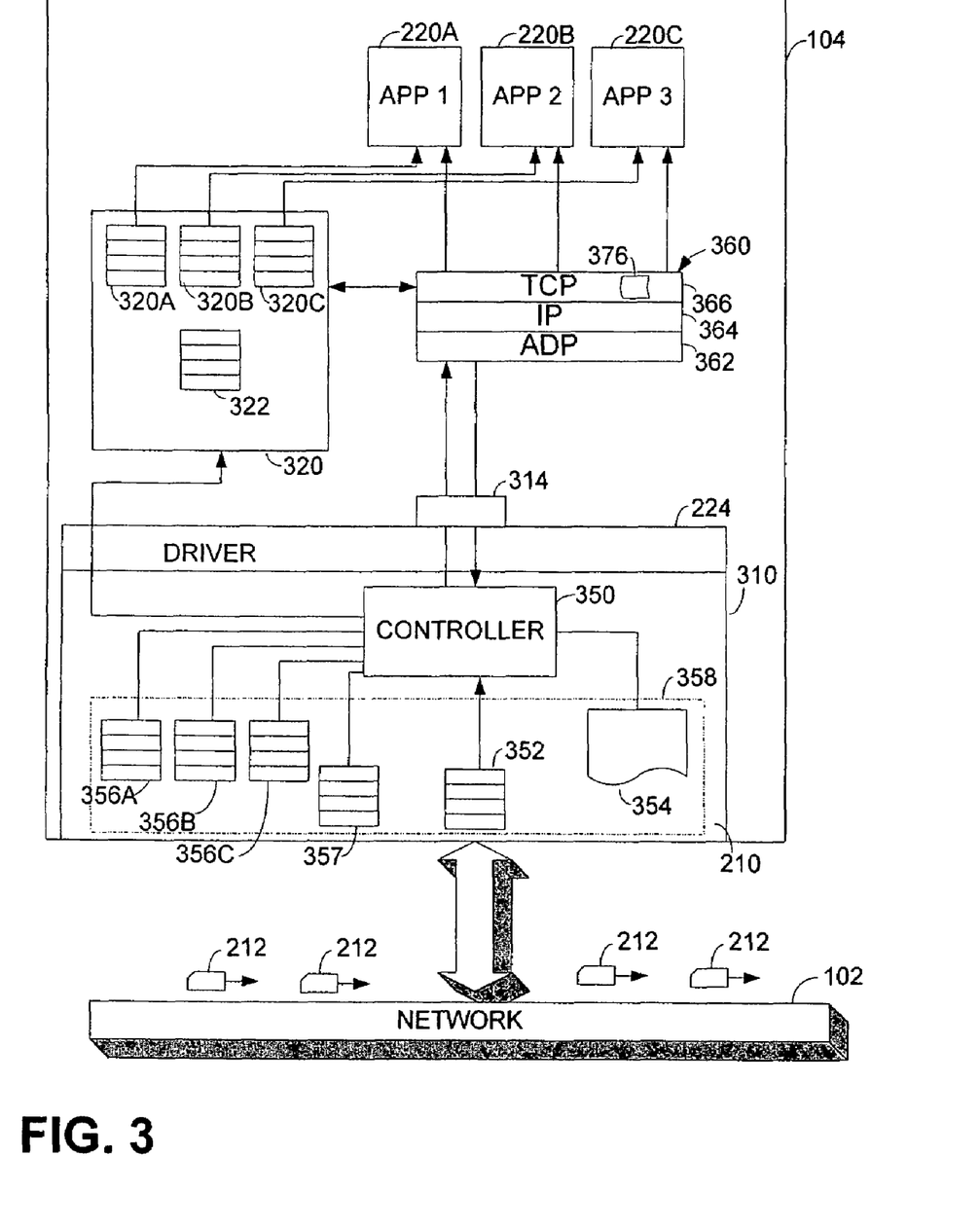
FIG. 3 is a functional block diagram of a computer according to an embodiment of the invention.

To further illustrate processing of received packets, FIG. 3 shows a functional block diagram of computer 104 that illustrates interaction of components that may be implemented as hardware or software. As illustrated in FIG. 3, network interface 310 includes hardware and software components. In this representation, network interface 310 includes physical network interface card 210, driver 224 and programming interface 314.

Communication software within operating system 222 (FIG. 2) is depicted as stack 360. Stack 360 has multiple layers, each processing a different protocol layer used for communications over network 102. As illustrated, each of the layers of stack 360 is a separate module, of which ARP layer 362, IP layer 364 and TCP layer 366 are shown. ARP, IP and TCP are examples of protocols that may be used for communication over a network. The ARP/IP/TCP layered protocol is widely used for network communications, but the invention is not limited to these protocols. More generally, offloading of received functions may be performed for communications in any format in which a map between received data and an intended destination may be specified.

In the embodiment of FIG. 3, applications 220A, 220B and 220C, are shown. In FIG. 3, three applications are illustrated, but the number of applications on computer 104 is not a limitation on the invention. Also, FIG. 3 illustrates each of the applications being the destination for one connection. An application could be a destination for any number of connections. Further, examples of applications, such as a word processor or e-mail program, were provided. An application may be any component that is a destination for network data. Accordingly, the type and construction of the applications is not a limitation on the invention.

Each of the applications 220A, 220B and 220C retrieves data sent to it over network 102 from memory 230. Memory 230 contains data structures organizing data directed to the applications. In the embodiment of FIG. 3, memory 230 contains application buffers 320A, 320B and 320C. Each of the application buffers 320A, 320B and 320C is associated with a connection for which an application 220A, 220B and 220C is a destination. When the application receives an indication from stack 360 that data has been received, the application reads the data from its corresponding application buffer 320A, 320B or 320C.

Memory 230 also contains a general buffer 322. General buffer 322, similar to application buffers 320A, 320B and 320C, may be a data structure formed in memory 230 to hold received data. In a conventional computer system, network interface 310 transfers all received data to a general buffer, such as buffer 322, and notifies stack 360 that data was received. TCP layer 366 then obtains the data from general buffer 322, determines the appropriate destination application based on the connection associated with the received data and then transfers the data to the appropriate application buffer 320A, 320B or 320C.

However, these functions of TCP layer 366 may be offloaded to network interface 310. In the illustrated embodiment, TCP layer 366 provides network interface 310 with information on connections that allows network interface 310 to select an application buffer 320A, 320B or 320C for which data in packets received over network 102 is ultimately destined. Network interface device 310 uses this information to transfer the received data to the appropriate application buffer.

In order to transfer the data from packets received to the appropriate application buffer regardless of the number or types of connections that have been established, network interface 310 includes configurable control circuitry. In the embodiment illustrated, configurable controlled circuitry includes controller 350 and map 354.

Controller 350 may be implemented as one or more application-specific integrated circuit (ASIC), one or more field programmable gate arrays, or in any other suitable fashion.

Map 354 may be stored in memory 358 on physical network interface card 210. In some embodiments, map 354 is created as a data structure in memory 358.

Figure 4:
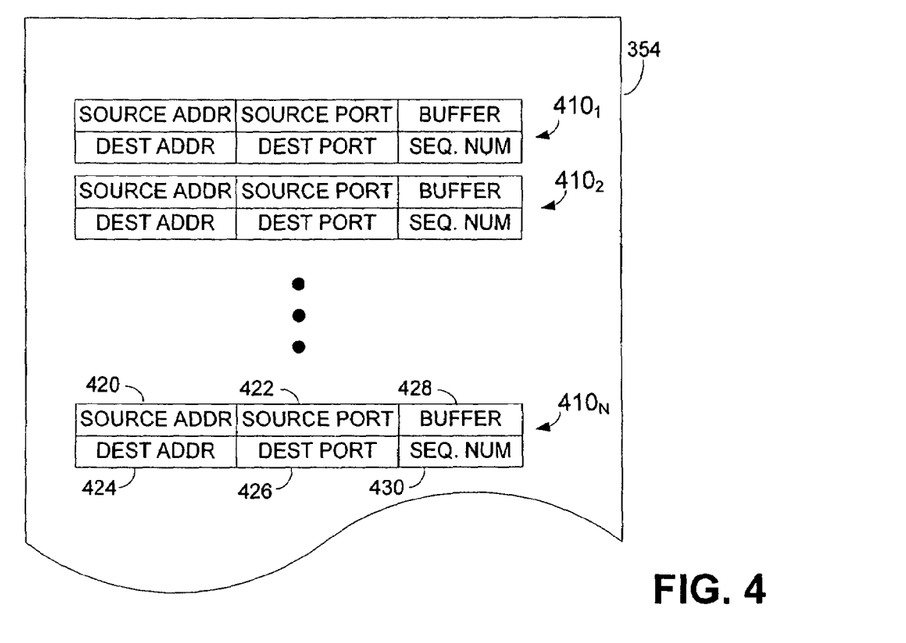
FIG. 4 is a sketch of a data structure maintained by a network interface according to an embodiment of the invention.

As shown in more detail in connection with FIG. 4, map 354 contains information identifying connections that have been formed with applications in computer 104 as destinations. For each such connection, map 354 stores an identification of one of the application buffers 320A, 320B and 320C. Using the information in map 354, controller 350 may transfer data from received packets to the appropriate application buffer. Controller 350 may then, through interface 314, notify stack 360 that data has been stored in an application buffer. Because the data is already in an application buffer, processing by stack 360 in response to such a notification is less than in a conventional stack.

In the pictured embodiment, little additional processing capability is included in controller 350 to identify an appropriate application buffer. The processing can consist predominantly of matching information contained in the header of received data packets to information stored in map 354. If a match exists, controller 350 can obtain from map 354 information used to transfer the data to the appropriate locations in memory 230.

In the embodiment illustrated, network interface 310 receives packets over network 102. As each packet is received, it is stored in receive queue of which receive queue 352 is illustrative. Though, in some embodiments multiple receive queues may be present. Controller 350 may process the packets received from receive queue 352 in the order in which they are received. For each packet identified as a data packet associated with a connection for which information is stored in map 354, controller 350 may move the packet from receive queue 352 to an appropriate data packet buffer 356A, 356B or 356C. If an appropriate data packet buffer does not exist, or a packet is not a data packet, controller 350 may move the received packet in receive packet buffer 357. The packets may be moved singly as they are received. Though, in some embodiments, rules may be programmed for controller 350 to move groups of related packets at one time.

When controller 350 transfers data to memory 230, the data from each of the data packet buffers is transferred to the appropriate application buffer 320A, 320B or 320C. Any suitable mechanism may be used to transfer the data. Though, in some embodiments a DMA operation is used. The packets stored in receive packet buffer 357 may also be transferred through a DMA operation to general buffer 322.

Stack 360 may process the packets from general receive buffer 322 as in a conventional computer system. However, significantly less processing is required for packets already stored in an application buffer 320A, 320B or 320C. For packets already in an application buffer, TCP layer 366 may receive an indication that a packet has been stored in an application buffer. TCP layer 366 may notify the appropriate application that data is available. However, TCP layer 366 is not required to perform processing on received packets to identify the appropriate application buffer in which they should be stored or to transfer data from a general buffer to an application buffer. Consequently, the load on processor 240 (FIG. 2) may be reduced because of the processing offloaded to network interface 310.

However, the requirements on network interface 310 to be able to perform this offloaded processing are lightweight because little additional processing capability is required to make this transfer. Controller 350 may use any suitable data transfer techniques. However, in the pictured embodiment, controller 350 uses direct memory access (DMA) over bus 250 (FIG. 2) for the transfers to memory 230. Conventional network interface devices use DMA to transfer data for further processing in a stack 360. Accordingly, no additional functionality is required in controller 350 to support DMA operations for processing of offloaded functions. The data transfer when controller 350 is performing offloaded functions differs from that in a conventional network interface without offload because the destination address for the DMA transfer is obtained from map 354 rather than being a predefined general buffer, such as general buffer 322.

Further, it is not necessary for network interface 310 to incorporate processing capabilities to track the state of connections that have been established or to otherwise maintain those connections. Because stack 360 still receives notification that packets have been received, it may perform any additional function needed to maintain communications according to the protocol of network 102. Packet header information may be provided as part of such a notification, allowing stack 360 to track state information and perform other suitable functions. For example, FIG. 3 shows that TCP layer 366 stores state information 376. As TCP layer 366 receives notifications that packets have been received, it may update state information 376 as in a conventional computer system or in any other suitable way. By maintaining state information in stack 360 rather than offloading this function to network interface device 310, the requirements on network interface device 310 remain relatively lightweight. If the state information 376 maintained by TCP layer 366 alters the mapping information, TCP layer 360 may send commands through interface 314 to update the map 354.

Processing in network interface device 310 is also relatively lightweight because controller 350 does not need to respond to all possible conditions that may occur during network communication. Though in some embodiments simple and efficient rules will be specified that allow controller 350 to identify an application buffer associated with most packets, some packets may not be matched to an application buffer. If network interface device 310 receives a packet that cannot be matched to one of the application buffers 320A, 320B or 320C based on information in map 354, controller 350 may store the packet in receive packet buffer 357. From receive packet buffer 357, the packet can be transferred to general buffer 322, where it will be processed by stack 360 in the conventional fashion, or in any other suitable way.

In the embodiment illustrated in FIG. 3, though the described structure of network interface 310 is lightweight, variations are possible. DMA transfers of data packets to application buffers 320A, 320B and 320C are facilitated because network interface device 310 includes multiple data packet buffers. In the embodiment of FIG. 3, three data packet buffers 356A, 356B and 356C, one corresponding to the each active connection, are shown. However, any number of received packet buffers may be provided in network interface 310. In the pictured embodiment, the data packet buffers can be formed by partitioning memory 358. The partitioning may be static or dynamic and the number of buffers may be fixed or variable, but data packet buffers may be formed in any suitable way.

Providing a separate data packet buffer for each connection provides a simple mechanism for controller 350 to identify which data is to be transferred to which application buffer 320A, 320B, 320C. However any suitable method may be used to allow controller 350 to identify during a DMA operation which received packets should be transferred to which application buffer. In some embodiments, no separate data packet buffer may be provided. Instead, receive queue 352 may be used as the data packet buffer.

However, providing one or more data packet buffers facilitates ordering of data packets by controller 350 data so that the data is transferred to application buffers 320A, 320B or 320C in the order in which it was transmitted. The received packets may be ordered based on information in received packets. For example, TCP packets have a header including a sequence number. Controller 350 may store received packets in a receive buffer in an order according to the sequence number in the packet headers.

Controller 350 may also combine packets to further offload processing from network stack 360. Controller 350 may use packet header information, such as sequence information, to identify sequential packets, fragmented packets or other packets that may be combined. In some embodiments, controller 350 may receive from stack 360 information defining how to combine the control data present in multiple packets (inside the TCP headers) into one notification such that no information is lost but packets may still be grouped.

Turning now to FIG. 4, additional detail of map 354 is shown. In the pictured embodiment, map 354 is implemented as a data structure in memory 358 on physical network interface card 210. However, map 354 may be created in any suitable way.

In the embodiment illustrated, map 354 contains multiple records, here illustrated as records $410_1, 410_2 \ldots 410_N$. The number of records is not a limitation of the invention. In some embodiments, map 354 may contain a record for each connection established by network stack 360. However, in some embodiments, memory 358 on physical network interface card 210 may be of limited size. Accordingly, the number of records in map 354 may be limited by the amount of memory on physical network interface card 210 available to store records. If packets are received through a connection for which a map 354 is not large enough to store a record, those packets may be processed as in a conventional network interface card, without detracting from the capabilities of computer 104 to offload processing for packets that match a record in map 354. Accordingly, the size of map 354 is not a limitation on the invention.

In the embodiment illustrated, each record has the same format, though that is not a limitation on the invention. Taking record $410_N$ as illustrative, each record contains three types of information, though the specific type of information stored in map 354 is not a limitation on the invention and embodiments may be constructed with different or additional types of information. In the embodiment of FIG. 4, each record contains information identifying a connection, information identifying a location to store data received over that connection and information qualifying the packets for which data may be transferred to an application buffer.

In the example of FIG. 4, the packets are received in a TCP protocol. Accordingly, four fields are shown containing information defining a TCP connection. Field 420 stores a source address. Field 422 stores a source port. Field 424 stores a destination address and field 426 stores a destination port. In the TCP protocol, the four-tuple of source address, source port, destination address and destination port defines a connection and any packet with a header containing values for source address, source port, destination address and destination port matching those stored for record $410_N$ can be identified as associated with the connection described by record $410_N$.

Field 428 defines the application buffer for which data corresponding to the connection described in record $410_N$ is stored. The destination buffer may be identified in field 428 in any suitable way. In the pictured embodiment, the information in field 428 identifies an address in memory 230 (FIG. 2)

at which the next data values received over the connection described by record $410_N$ are to be stored. The address may be represented in any suitable way, including directly by identifying a physical address in memory 230, indirectly by specifying an offset from an address in memory 230 or by referencing a further data structure that includes a pointer to the next location in the application buffer at which data associated with the connection defined by record $410_N$ should be stored.

Record $410_N$ also includes a sequence number in field 430. In the illustrated embodiment, the sequence number acts as a qualification on the packets for which data is transferred to an application buffer. The sequence number may specify the sequence number for the next packet expected over the connection. Though controller 350 could be constructed to process out-of-order packets, by using the sequence number to identify packets to be transferred to an application buffer, out-of-order packets are processed in stack 360, reducing the processing requirements on controller 350.

Figure 5:
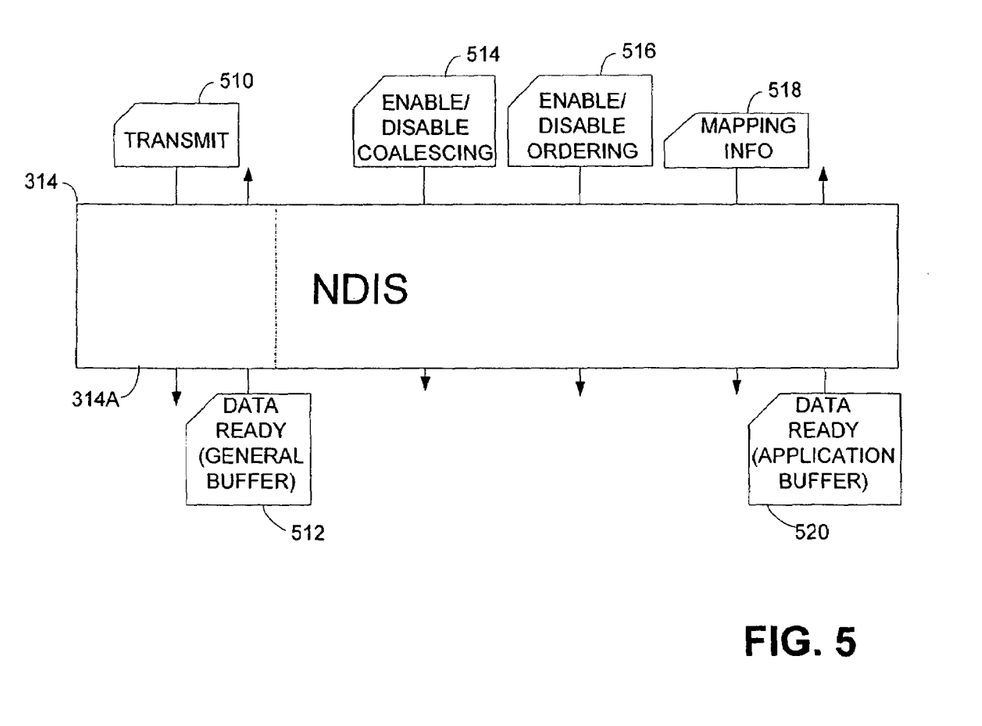
FIG. 5 is a sketch of a programming interface to a network interface according to an embodiment of the invention.

Turning to FIG. 5, additional details of interface 314 are shown. In the illustrated embodiment, interface 314 is a network driver interface specification (NDIS) interface. However, any suitable network driver interface may be used. Regardless of the form of interface 314, the interface allows command information to be provided to network interface 310 and for network interface 310 to provide status information.

FIG. 5 pictures interface 314 schematically, showing that it has a portion 314A and a portion 314B. Portion 314A depicts the portion of interface 314 that exchanges command and status information as in a conventional network driver. This command and status information is illustrated by transmit command 510 and data-ready status information 512. Though not expressly shown, hardware connections for signaling status information may also form part of the interface. For example, physical network interface device 210 may assert an interrupt line when status information 512 is available through interface 314. However, any suitable mechanism to transmit the illustrated information may be used.

Transmit command 510 may be generated by stack 360 (FIG. 3) as in a conventional computer system. Stack 360 may also respond to status information 512 as in a conventional computer system by retrieving packets from general buffer 322 and processing those packets according to the network protocol. Though not expressly shown, portion 314A of interface 314 may process different or additional commands or status information.

Portion 314B represents an extension of interface to 314A that enables offload processing according to an embodiment of the invention. Portion 314B extending interface 314A may be implemented in any suitable way. For example, interface 314A may recognize OIDs or other objects identifying commands. Portion 314B may be implemented by increasing the number of distinct command objects that interface 314 may recognize.

FIG. 5 shows that portion 314B includes a command 514 to enable or disable coalescing. When coalescing is enabled, controller 350 transfers data packets to application buffers 320A, 320B or 320C accordingly to the offloaded processing described above. When coalescing is disabled, received data packets are transferred to general buffer 322 as in a conventional computer system.

Command 516 enables or disables packet ordering. As described above in connection with FIG. 3, controller 350 may transfer received data packets to an application buffer 320A, 320B or 320C based on the order in which the data packets are sent. When command 516 enables packet ordering, controller 350 transfers received packets in this order. Conversely, when command 516 disables ordering, controller 350 transmits packets in the order received, to the extent the packets match any criteria specified in map 354. Other commands may control other functions.

Interface portion 314B also supports transfer of mapping information to network interface device 310. In this example, command 518 is illustrated. Interface 314B supports command 518 by, in response to the command, storing in map 354 parameters communicated with command 518. The parameters communicated with command 518 may identify a new connection, causing a new record to be created in map 354. Alternatively, parameters transmitted with mapping command 518 may update information previously stored in a record in map 354. For example, in embodiments in which a sequence number of the next data packet expected is stored in a record, such as in field 430, command 518 may be used to update the sequence number as packets are received and the expected sequence number changes. Additionally parameters associated with command 518 may specify that a record in map 354 be deleted.

Although not expressly shown in FIG. 5, interface 314B may include additional or different commands, depending on the capabilities implemented in network interface device 310 (FIG. 3).

Extension portion 314B also supports communication of one or more types of a status information from network interface 310 to network stack 360. In the embodiment illustrated in FIG. 5, status information 520 is communicated from network interface 310, indicating that data from a received packet has been transferred to an application buffer, such as 320A, 320B or 320C. The status information 520 may be in any suitable form and may include information identifying the particular application buffer to which data has been transferred.

Additionally, other types of status information may be transferred along with an indication that data is ready in an application buffer. For example, in embodiments in which multiple received packets may be combined or transferred in one operation to an application buffer, status information 520 may indicate the sequence numbers of the packets processed or otherwise provide information needed by network stack 360 to update state information on a connection. State information, for example, may include fields in a TCP header or other control data relating to multiple packets. Other types of status information may include an indication of the capabilities of the network interface or any other suitable information.

The specific format of the commands and status information conveyed through interface extension portion 314B is not a limitation on the invention. For example, though FIG. 5 shows a single command 518, but separate commands may be used to create a new record in map 354 identifying a new connection and to update information that changes as the state of the connection changes. Conversely, though FIG. 5 shows two instances of data ready status information 512 and 520, data ready status information 512 and data ready status information 520 may be provided by a single status reporting construct with different parameters, each parameter indicating the buffer to which data has been transferred.

Figure 6A:
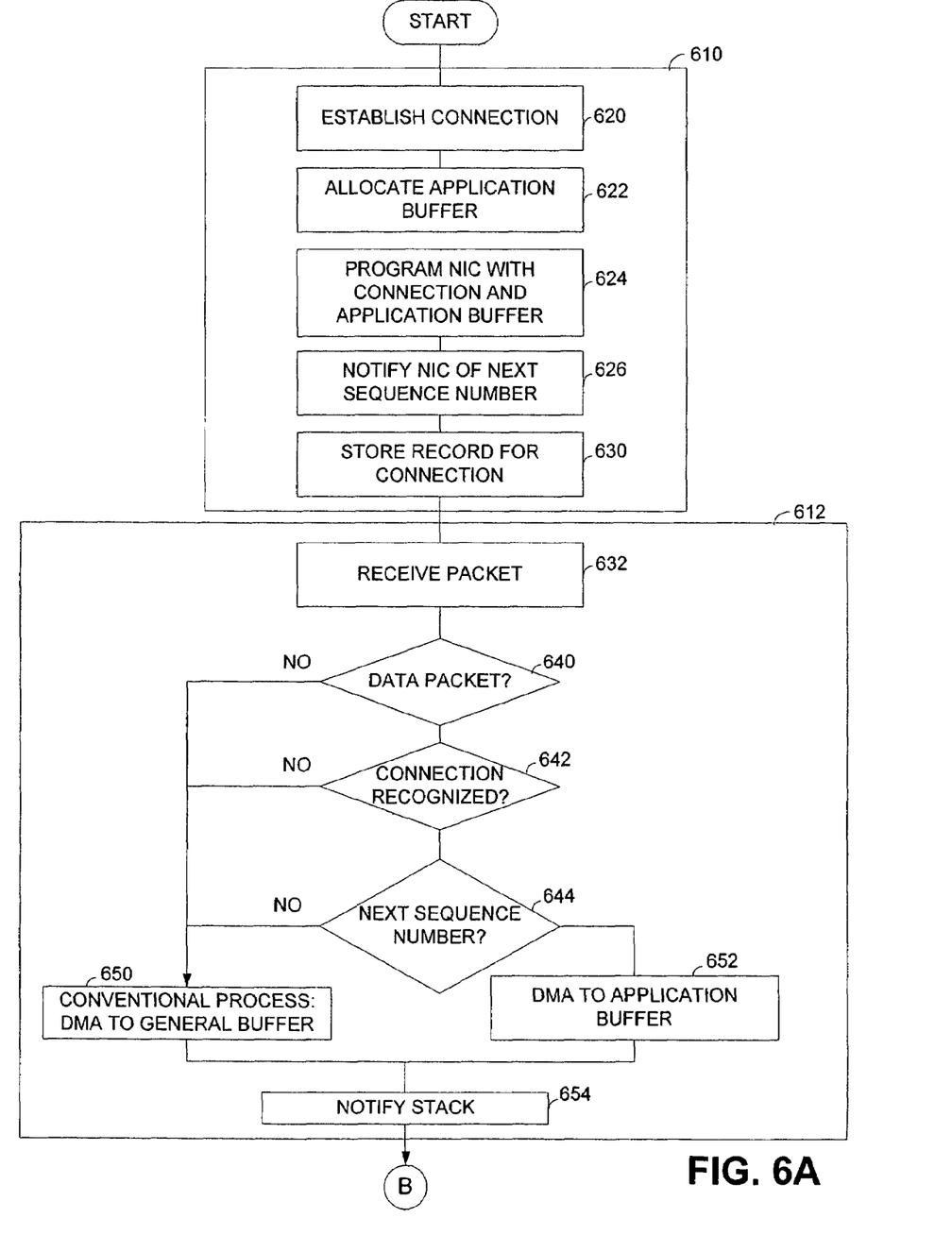
FIGS. 6A and 6B are a flow chart of a method of operation of a network interface according to an embodiment of the invention.
Figure 6B:
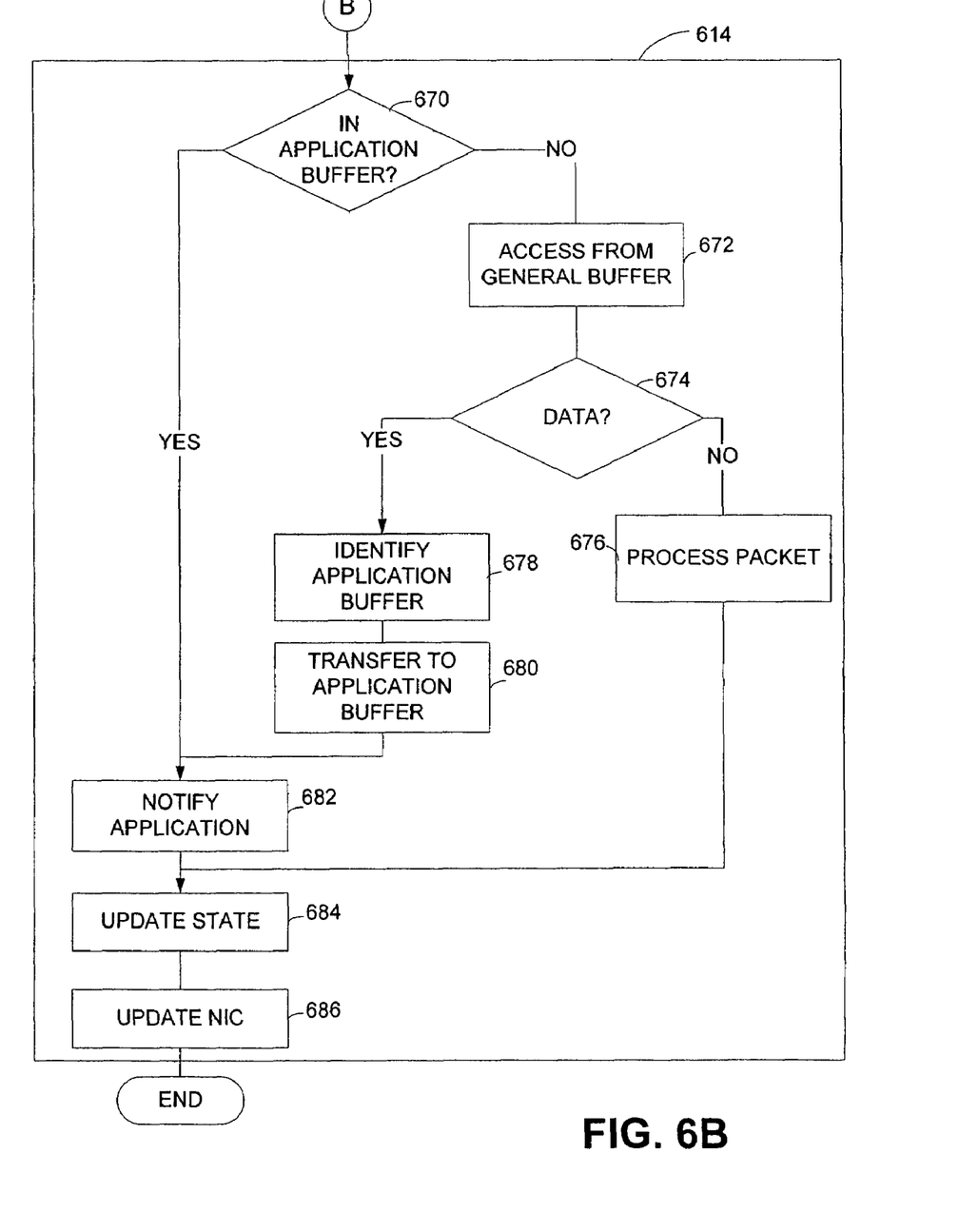

Turning to FIGS. 6A and 6B, a flow chart of processing performed by a computer system according to an embodiment of the invention is illustrated. FIGS. 6A and 6B show three subprocesses, subprocess 610, subprocess 612 and subprocess 614. Though the processing illustrated in FIGS. 6A and 6B may be performed in any suitable hardware or software component of a computer system, subprocess 610 may be performed by the interaction of communication software of an operating system of a computer and a network interface, such as a network interface card (NIC) installed in the computer. Subprocess 612 may be performed in the NIC. Subprocess 614 may also be performed in the communication software. In some embodiments, one or more of subprocesses 610, 612 and 614 may be omitted. For example, subprocess 610 is typical for an application receiving date. That subprocess or other processing illustrated in FIGS. 6A and 6B may not be present in embodiments in which an application only transmits data.

In the embodiment illustrated in FIG. 6A, subprocess 610 begins at block 620 where a connection is established. A connection may be established in any suitable way. In the described embodiment, a connection is established by an exchange of packets between two computers on which the applications that form the end points of the connection reside. In the embodiment of FIG. 4 in which the connection is established in the TCP protocol, the exchange of packets at block 620 may communicate source and destination addresses and result in the assignment of source and destination ports for the end points.

At block 622, an application buffer is allocated to the connection. The application buffer may be allocated in any suitable way, including according to processing as in a conventional computer communicating over a network.

At block 624, a network interface device is programmed with information that will allow the network interface device to identify data packets associated with a connection and to transfer those data packets to an appropriate application buffer. For a network interface device communicating through a network interface in the form of interface 314 (FIG. 5), the processing at block 624 may include sending a command through the interface in the form of command 518. However, any suitable method of communicating information may be used at block 624.

At block 626, the network interface device is notified of the next sequence number for a data packet that may be transferred to the application buffer allocated at block 622. The NIC may be notified at block 622 using any suitable processing. For a NIC communicating through an interface in the form of interface 314 (FIG. 5), processing at block 626 may include sending a command in the form of command 518. However, any suitable processing may be used to notify the NIC of the next sequence number. In some embodiments, processing at block 626 may be omitted, though in other embodiments processing at block 626 may include providing the NIC with other criteria on packets for which data should be transferred to an application buffer.

At block 630, the NIC stores a record for the connection established in subprocess 610. In the embodiment illustrated in FIG. 3, processing at block 630 may involve creating a record in map 354. However, any suitable representation of the connection may be used.

Once subprocess 610 is completed, the NIC is programmed to identify the data packets associated with a connection and transfer those data packets directly to an application buffer assigned for that connection. Subprocess 610 may be executed any number of times, depending on the number of connections that the NIC will recognize. Furthermore, though subprocess 610 is illustrated as occurring before subprocesses 612 and 614, subprocess 610 may be repeated multiple times, including during or after execution of subprocesses 612 and 614.

Regardless of the number of connections that the NIC is programmed to recognize and when that programming occurs, once the NIC is programmed to recognize data packets associated with at least one connection, it may perform subprocess 612.

Subprocess 612 begins at block 632. At block 632, the NIC receives a packet. Reception of the packet at block 632 may be performed in any suitable way, including as in a conventional network interface device.

Regardless of how the packet is received, processing proceeds to decision block 640. At decision block 640, the process branches depending on whether the received packet is a data packet. If the received packet is not a data packet, processing proceeds to block 650. At block 650, conventional processing may be performed on the packet. For example, some packets are subsumed within network interface cards and not notified to the network stack at all. The processing of such packets need not be altered in a NIC operating according to embodiments of the invention. For systems in which packets other than data packets are provided to the network stack, the received packet may be transferred to a general purpose buffer as in a conventional network interface device.

Conversely, if the received packet is a data packet, processing proceeds to decision block 642. At decision block 642, the process branches based on whether the received packet is associated with a connection that the NIC has been programmed to recognize. If the packet is associated with a connection that is not recognized by the NIC, processing again branches to block 650 where the received packet may be processed according to conventional processing. For data packets, processing at block 650 may entail transferring the data packet, such as through a DMA operation, to a general purpose buffer accessed by a network stack. However, any suitable form of conventional processing may be performed at block 650 in response to a data packet that is not associated with a recognized connection.

If the received data packet is associated with a connection that the NIC is programmed to recognize, processing proceeds to decision block 644. At decision block 644, the process branches based on whether the packet complies with any criteria specified for data packets that may be transferred to an application buffer. In this example, the process branches at decision block 644 based on whether the sequence number of the received packet matches a sequence number that the NIC has been programmed to expect for the next packet.

If the packet does not meet the criteria applied at decision block 644, the process branches to block 650. At block 650, the received packet may be processed as in a conventional process. For a data packet, that processing may include a DMA operation to a general buffer, such as general buffer 322 (FIG. 3). However, any suitable processing may be performed at block 650.

Conversely, if the processing at decision block 644 determines that the received data packet meets the criteria specified for a connection the NIC is programmed to recognize, processing continues to block 652. At block 652, the received data packet is transferred to the application buffer based on information programmed into the NIC. In the pictured embodiment, a received packet is transferred to an application buffer in a DMA operation performed over a bus, such as bus 250 (FIG. 2). However, any suitable method of transferring the packet to the designated application buffer may be used.

It should be appreciated that FIGS. 6A and 6B show a logical sequence of steps. It is not a limitation on the invention that the sequence of steps occurs exactly as shown. For example, a DMA operation at blocks 650 or 652 need not occur immediately upon reception of a packet. In the embodiment of FIG. 3, for example, received packets are stored in buffers such as 356A, 356B, 356C or 357 upon reception. Packets may be held in these buffers until ready for transfer.

Other processing steps may occur while packets are stored in buffers within the network interface device. As one example, multiple packets may be received between the time that one received packet is recognized as belonging to a connection and the time at which that packet is transferred to an application buffer assigned to that connection. Accordingly, though FIG. 6A illustrates that one packet is transferred at block 652, multiple packets may be transferred as part of the same DMA operation illustrated as occurring at block 652.

Regardless of the number of packets transmitted at blocks 650 or 652 and the time at which the transfers occur, once a packet has been transferred from the network interface device to a buffer for further processing, processing proceeds to block 654. At block 654, the network stack is notified that data has been transferred to a buffer. Notification at block 654 may include an indication of the buffer to which the packet has been transferred. In the embodiment of FIG. 3, the notification may indicate whether the packet was transferred to a general buffer, such as general buffer 322, or an application buffer, such as application buffer 320A, 320B or 320C.

Regardless of the buffer to which the received packet is transferred, processing may then proceed to subprocess 614 (FIG. 6B). In the illustrated embodiment, subprocess 614 represents processing that may be performed in a network stack in response to an indication that a packet has been received.

In the embodiment pictured, subprocess 614 begins at decision block 670. At decision block 670, the process branches depending on whether the packet notified to the network stack is stored in an application buffer. If the received packet is not stored in an application buffer, the process branches to block 672.

At block 672, the network stack begins processing the received packet by retrieving the packet from a general buffer. Processing at block 672 may be performed in any suitable fashion and may not necessarily require physical copying of information in the general buffer. Rather, processing at block 672 may involve reading only a portion of the information stored from the general buffer associated with the packet.

Using the information accessed at block 672, the process branches at decision block 674 based on whether the received packet represents a data packet. If the received packet is not a data packet, the process branches to block 676.

At block 676, the received packet is processed. In the pictured embodiment, processing at block 676 may be as in a conventional network stack for non-data packets. However, any suitable processing may be performed at block 676.

Conversely, if the received packet is identified as a data packet at decision block 674, the process branches to block 678. At block 678, the received packet is processed to identify the connection with which it is associated. Once the connection is identified, the application buffer to which the data in the packet should be written is also identified. In the embodiment illustrated, block 678 is shown occurring immediately following decision block 674. In some embodiments, intervening processing may occur. For example, an application buffer may not be immediately available. In such a scenario, processing at block 678 may occur after a delay or after other processing to establish the application buffer.

At block 680, the data from the packet is transferred from the general buffer to the identified application buffer. This processing may also be as in a conventional network stack.

The process continues to block 682 where the application that is the destination for the received data packet is notified. For processing when the received packet is transferred to an application buffer by the NIC, processing may proceed directly from decision block 670 to block 682.

Processing at block 682 may be in any suitable form, including processing as is conventional in a networked computer. The notification provided to the application may be in the same form regardless of whether the network interface device or network stack transferred data to the application buffer.

Once the application has been notified that data is available, the application may access that data in the application buffer and process it in any suitable way.

Processing then continues to block 684. At block 684, the network stack may update the state of the connection through which the received packet was received. The specific protocol used by the network stack, and the events that cause the state of the connection to change, are not limitations on the invention. Accordingly, any suitable processing to update the state of the connection may be performed at block 684. In the illustrated embodiment, processing at block 684 may be as is conventional in a network stack implementing the TCP protocol.

Once the connection state is updated, processing continues to block 686. If the updated state computed at block 684 alters the mapping information needed by the NIC to identify packets that can be transferred to an application buffer, programming of the NIC is updated at block 686. Update information may be provided to the NIC in any suitable format. In the pictured embodiment, processing at block 686 may be similar to processing performed at block 630 at which mapping information was initially transferred to the NIC. However, as described above in connection with interface 314 (FIG. 5), different commands may be used for initial programming of a NIC and for updating dynamic information, such as state information that changes as network communications occur.

Once the processing at block 686 is completed, subprocess 614 ends. As with processing in subprocesses 610 and 612, the processing of subprocess 614 is not limited to the specific order of steps shown in FIG. 6B. For example, subprocess 614 may be performed once for each received packet. Multiple instances of subprocess 614 may therefore be performed and steps of the instances may be interleaved or combined.

FIG. 6B illustrates the manner in which offloading receive processing to a network interface device that can transfer data to an application buffer reduces the load on the processor executing the network interface stack. For data packets not transferred to an application buffer by the network interface device, processing at blocks 672, 678 and 680 is performed in the stack. In contrast, these processing steps may be omitted for packets transferred to an application buffer by the network interface device, as can be seen by the branching of the process from decision block 670 directly to block 682. Though additional process steps not shown in FIG. 6B may be performed between the decision block 670 and block 682, the total amount of processing required by a network stack may be reduced by transfer of data packets to an application buffer.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A network interface adapted for connecting a computer to a network to enable the computer to receive packets over the network, each packet being associated with a connection of a plurality of connections, the connection being associated with an application that accesses data received over the network in an application buffer of a plurality of application buffers, the network interface adapted for use with a network stack that accesses a general buffer, the network interface comprising:

a memory;

a programming interface adapted to receive at least one configuration command defining a mapping between each connection of at least a portion of the plurality of connections and an application buffer of the plurality of application buffers;

a computer-readable medium having stored therein a data structure storing a map between each of a plurality of connections and a plurality of application buffers, wherein the computer-readable medium further has stored therein a data structure for holding packets, the packets being segregated by connection and ordered by sequence number for each connection; and configurable control circuitry adapted to recognize a packet as associated with a recognized connection of the plurality of connections based on the at least one configuration command and to transfer the packet to a recognized application buffer of the plurality of application buffers that is mapped to the recognized connection when the packet is recognized as associated and to transfer the packet to the general buffer when the packet is not recognized as associated with any of the plurality of connections, wherein:
the memory is dynamically configured into a plurality of packet buffers to associate each packet buffer of the plurality of packet buffers with a connection of the plurality of connections;
when the configurable control circuitry recognizes the packet as associated with the recognized connection, the packet is transferred to a selected packet buffer of the plurality of packet buffers, the selected packet buffer being selected based on an association with the recognized connection; and
the packet is transferred to the recognized application buffer from the selected packet buffer.

2. The network interface of claim 1, wherein the network interface comprises a physical network interface card and computer-readable medium encoding a driver adapted to control the physical network interface card.

3. The network interface of claim 1, further comprising:
a receive queue adapted to hold the packet upon receipt, wherein the configurable control circuitry is adapted to transfer the packet from the receive queue to the selected packet buffer.

4. The network interface of claim 1, wherein the data structure comprises a record for each of the plurality of connections and each record comprises a field storing a sequence number of a next packet.

5. The network interface of claim 1, wherein the programming information is further adapted to receive criteria of packets to be transferred to the application buffer.

6. A method of operating a network interface on a computer having a plurality of applications, each application accessing data received over a network in an application buffer of a plurality of application buffers, the method comprising:
programming the network interface, by recording in a computer readable medium, a mapping specifying associations between a plurality of connections and the plurality of application buffers;
receiving packets over the network at the network interface;
maintaining for each application buffer a next sequence number for storage in the application buffer; and
for each received packet that is a data packet associated with an application buffer:
when the data packet has the next sequence number for the associated application buffer, transferring at least a data portion of the data packet to the associated application buffer in accordance with the mapping and transferring a header associated with the data packet to a network stack; and
when the data packet does not have the next sequence number for the associated application buffer, transferring the data portion of the data packet and the header associated with the data packet to the network stack.

7. The method of claim 6, wherein programming the network interface comprises providing at least one command through a programming interface to a network interface card.

8. The method of claim 6, wherein programming the network interface comprises specifying a next sequence number for a connection.

9. The method of claim 8, further comprising dynamically configuring a memory on the network interface to form a plurality of packet buffers.

10. The method of claim 9, wherein transferring packets comprises at least one DMA operation from a packet buffer of the plurality of packet buffers.

11. The method of claim 10, further comprising ordering a plurality of packets related to a connection to form a plurality of ordered packets and wherein transferring packets comprises transferring the plurality of ordered packets in one DMA operation.

12. The method of claim 6, further comprising providing an indication to a network stack that a packet has been transferred, the indication being of a first type when the packets have been transferred to an application buffer and of a second type when the packet has been transferred to the general buffer.

13. A computer system coupled to a network, the computer system comprising:
a) a memory having a plurality of application buffers and a general buffer;
b) a plurality of applications, each adapted to access data in an application buffer of the plurality of application buffers;
c) a network stack adapted to retrieve and process packets from the general buffer and to maintain state information on each of a plurality of network connections established by the computer system; and
d) a network interface device coupled to the network and adapted to:
receive a data packet over the network and selectively transfer the data packet to the general buffer or an application buffer of the plurality of application buffers;
provide the network stack with information on the data packet impacting state of a network connection with which the packet is associated when the data packet is transferred to the application buffer of the plurality of application buffers; and
receive a command to configure the network interface to reorder packets before transfer to the application buffer,
wherein selectively transferring the data packet comprises:
when the data packet is addressed to an application associated with the application buffer, and the data packet has an out of order sequence number and the network interface is configured to reorder packets, buffering the packet and then transferring the data packet to the application buffer in conjunction with other received data packets; and
when the data packet is addressed to an application associated with the application buffer, and the data packet has an out of order sequence number and the network interface is not configured to reorder packets, transferring the data packet to the general buffer.

14. The computer system of claim 13, wherein the network interface device comprises a programming interface adapted to receive information specifying a mapping between each of a plurality of connections and the plurality of application buffers.

15. The computer system of claim 13, further comprising a bus interconnecting the network interface device and the computer-readable medium, wherein the network interface device has a controller adapted to act as a bus master for the bus.

16. The computer system of claim 13, further comprising an NDIS interface between the network stack and the network interface device.

17. The computer system of claim 13, wherein the network interface device has a control interface adapted to receive, for at least one application buffer of the plurality of application buffers, a source address, a destination address, a source port and a destination port.

18. The computer system of claim 13, wherein the network interface device has a control interface adapted to receive, for application buffer of the at least one application buffer, information defining a connection, the information consisting essentially of a source address, a destination address, a source port, a destination port and a sequence number.

* * * * *